(12) United States Patent
Lee et al.

(10) Patent No.: US 6,826,395 B2
(45) Date of Patent: Nov. 30, 2004

(54) SYSTEM AND METHOD FOR SECURE TRADING MECHANISM COMBINING WIRELESS COMMUNICATION AND WIRED COMMUNICATION

(75) Inventors: Jun-Yih Lee, Kaohsiung (TW); Sung-Yao Chang, Taoyuan Hsien (TW); Ching-Feng Wang, Tainan (TW)

(73) Assignee: Telepaq Technology, Inc. (TW)

( * ) Notice: Subject to any disclaimer, the term of this patent is extended or adjusted under 35 U.S.C. 154(b) by 451 days.

(21) Appl. No.: 09/920,547

(22) Filed: Aug. 1, 2001

(65) Prior Publication Data

US 2002/0019223 A1 Feb. 14, 2002

(30) Foreign Application Priority Data

Aug. 3, 2000 (TW) .......................................... 89115563

(51) Int. Cl.$^7$ ................................................. H04M 1/66
(52) U.S. Cl. .................... 455/411; 455/410; 455/414.1; 705/64; 705/67; 705/71
(58) Field of Search ................................. 455/406, 410, 455/414.1, 411, 408; 705/64, 67, 71

(56) References Cited

U.S. PATENT DOCUMENTS

| | | | |
|---|---|---|---|
| 5,652,752 A | * | 7/1997 | Suzuki et al. ............... 370/330 |
| 6,026,165 A | * | 2/2000 | Marino et al. ............... 380/273 |
| 6,338,140 B1 | * | 1/2002 | Owens et al. ............... 713/168 |
| 6,549,626 B1 | * | 4/2003 | Al-Salqan .................... 380/286 |
| 6,577,861 B2 | * | 6/2003 | Ogasawara .................. 455/419 |
| 6,587,835 B1 | * | 7/2003 | Treyz et al. ................... 705/14 |
| 2002/0169984 A1 | * | 11/2002 | Kumar et al. ............... 713/201 |

* cited by examiner

Primary Examiner—William Trost
Assistant Examiner—Marcos L Torres
(74) Attorney, Agent, or Firm—Peter F. Corless; Steven M. Jensen; Edwards & Angell, LLP

(57) ABSTRACT

A system and a method for a secure trading mechanism combining wireless communication and wired communication are proposed, which, in the condition of two-way trading constructed based on network connection of a wireless communication device functioning in two-way transmission to a trading server and a trading host of a wired communication devices, allow the trading to be performed in real time and the correctness to be determined for data transmitted between different levels of the network according to a secure communication protocol defined in each communication device, so as to assure the security of trading data in transmission, and prevent the trading data from being acquired or changed without authorization.

10 Claims, 10 Drawing Sheets uplink data

SYSTEM AND METHOD FOR SECURE TRADING MECHANISM COMBINING WIRELESS COMMUNICATION AND WIRED COMMUNICATION

FIELD OF THE INVENTION

The present invention relates to systems and methods for secure trading mechanisms, and more particularly, to a system and a method for a secure trading mechanism combining wireless communication and wired communication, applied to a security mechanism for e-commerce (electronic commerce) over the internet so as to assure the security of end-to-end trading in the current use of the wireless communication.

BACKGROUND OF THE INVENTION

Conventionally, a network is primarily used for transmitting e-mail and sharing peripheral computer resources. With the progress of electronic and communication technologies, the internet further provides a function of e-commerce, that is, access to processing a bank account, purchasing, claiming tax through the internet, etc. This makes human life more convenient and time-saving.

Currently, in order to claim tax through e-commerce, a user must apply an identity certificate from the government certification authority (GCA). At first, application software is downloaded from a web site of GCA, in which the user personally sets up a key to be stored in a "private key disk" and accordingly inputs related data to a "certificate disk" for storage. Subsequently, the user having an identification card thereof and the "certificate disk" can file for application at a service counter of the Taiwan Communication Company. After the application is successfully passed through examination, the user is able to download the identity certificate to the "certificate disk" through the internet. Alternatively, if the user is a Hinet user, application for the identity certificate can be filed directly through the internet, while examination for the application is executed by a controlling system of Hinet. In this case, people can complete a process for claiming tax in a manner of acquiring an electronic pocket software and a trading certificate, and then uploading claim-related data to the government tax office through the internet. This therefore provides benefits such as convenience and time-saving for people, who had been always queued for claiming tax in the past.

However, the security for trading through the network is a potential problem. Since the internet and local networks are connected through communication protocols such as TCP, IP, UDP, FTP, RPC, PIC, HTTP, SMTP, IEEE802.3 (Ethernet), etc. Intrinsically, these communication protocols have no encryption mechanism. Therefore, the internet environment is opened, for example, a packet password can be easily captured from a local network. Obviously, in the condition of no encryption and no secure communication protocol available for data transmitted between different levels (or layers) of the networks, the transmitted data can not be securely protected.

Moreover, wireless mobile communication services have become a mainstream in current communication services. Further due to the difficulty in construction, a wired, dedicated or fiber communication system must be gradually replaced by a wireless communication system. Therefore, IEEE defines the IEEE 802.11 as a standard for a wireless local network; whereas security-related services include a secure socket layer (SSL) communication protocol from Netscape family, a secure electronic transaction (SET) protocol for a secure paying mechanism of e-commerce, etc., which are commonly used security mechanisms. For the wireless local network, a wireless modem is originally used, which only allows end-to-end connection and employs radio frequency as a wireless transmission medium, that is therefore easy to be illegally acquired, used and destroyed. In this case, security is a significant consideration in the use of such a wireless local network.

In conclusion, it is desired to develop a novel system for securely trading through network communications, in which security can be assured for two-way trading, and a transaction can be performed in real time.

SUMMARY OF THE INVENTION

A primary objective of the present invention is to provide a system and a method for a secure trading mechanism combining wireless communication and wired communication, which, in the condition of two-way trading constructed based on network connection of a wireless communication device functioning in two-way transmission to a trading server and a trading host of a wired communication devices, allow the trading to be performed in real time. Moreover, the system and method of the invention in the foregoing condition can determine the correctness for data transmitted between different levels of the network according to a secure communication protocol defined in each communication device, so as to assure the security of trading data in transmission. In addition, in the system and method of the invention under the foregoing condition, first, a personal identification number (PIN) input by a user and a device identification code of the wireless communication device are encrypted, respectively. Then, the encrypted PIN and device identification code are incorporated and digitally signed. Subsequently, the encrypted PIN, the encrypted device identification code and the digitally-signed data are incorporated and further encrypted. In the use of multiple and different encryption processes, the trading data can therefore be prevented from being acquired or changed without authorization.

According to the foregoing and other objectives, the present invention provides a system and a method for a secure trading mechanism combining wireless communication and wired communication. The system of the invention comprises: wired communication devices including a plurality of trading hosts, a plurality of trading servers, and a plurality of wireless and wired data exchange gateways; and wireless communication devices including a plurality of wireless communication message interchange centers and a wireless two-way communication device.

The trading hosts each has a memory unit for storing an identity identification code, a personal identification number, a device identification code dedicated for a wireless two-way communication device of a user and a plurality of sets of keys, which are input by the user to the trading host; a secure communication protocol for allowing data transmission and communication with the trading servers; encryption and decryption software for encrypting and decrypting data received and transmitted by the trading host; a method for determining correctness of the personal identification number during trading; a method for modifying the personal identification number; and a function of being a router, so as to allow the trading hosts to serve as devices for registration prior to performing trading.

The trading servers each has a memory unit for recording a look-up table of correlation between the trading server and the trading hosts; a secure communication protocol for data transmission and communication with the trading hosts, and with the wireless and wired data exchange gateways; and a function of being a router; and the trading servers serve as communication interfaces between the trading hosts and the wireless and wired data exchange gateways, in a manner that the trading servers receive data from the trading hosts and transmit the data to the wireless and wired data exchange gateways, or receive data from the wireless and wired data exchange gateways and transmit the data to the trading hosts.

The wireless and wired data exchange gateways each has a memory unit for recording a look-up table of correlation between a trading type and the trading servers; a secure communication protocol for data transmission and communication with the trading servers, and with the wireless communication message interchange centers; and a function of being a router; and the wireless and wired data exchange gateways receive data from the trading servers and transmit the data to the wireless communication message interchange centers, or receive data from the wireless communication message interchange centers and transmit the data to the trading servers, so as to allow the wireless and wired data exchange gateways to serve as communication interfaces between the trading servers and the wireless communication message interchange centers.

The wireless communication message interchange centers each has a communication device for receiving and transmitting wireless messages; a secure communication protocol for data transmission and communication with the wireless and wired data exchange gateways, and with the wireless two-way communication device; and a function of being a router; and the wireless communication message interchange centers receive data from the wireless and wired data exchange gateways and transmit to the wireless two-way communication device, or receive data from the wireless two-way communication device and transmit the data to the wireless and wired data exchange gateways, so as to allow the wireless communication message interchange centers to serve as communication interfaces between the wireless and wired data exchange gateways and the wireless two-way communication device.

The wireless two-way communication device has a communication device for receiving and transmitting wireless messages; a memory unit for storing trading data and a device identification code dedicated for the wireless two-way communication device; a smart card for storing a plurality of sets of keys; a secure communication protocol for data transmission and communication with the wireless communication message interchange centers; encryption and decryption software for encrypting and decrypting data received and transmitted by the wireless two-way communication device; a method for inputting the personal identification number; and software for managing the trading; and the wireless two-way communication device serves as a controlling center for trading management of the present system, and has a wireless communication number for identifying an address of a transmitting network.

The method for a secure trading mechanism combining wireless communication and wired communication of the invention comprises the following steps. First, a user registers at a trading host, wherein the user inputs data including an unique identity identification code, a personal identification number and a device identification code dedicated for a wireless two-way communication device of the user, and stores the data in a memory unit of the trading host. Then, trading is initiated between the trading host and the wireless two-way communication device, in a manner that the wireless two-way communication device acquires information of the user about to perform e-commerce, verifies the user in correct identity, and transmits a set of keys stored in the trading host to a smart card of the wireless two-way communication device for storage. Finally, the trading is performed between the wireless two-way communication device and the trading host, in a manner that after the user inputs related trading data to the wireless two-way communication device, the related trading data are encrypted by the set of keys and transmitted to the trading host, wherein the trading data is merely able to be decrypted by the trading host so as to assure security of the trading data in transmission.

Moreover, prior to initiating the trading and after completing the registration, the method of the invention further comprises the steps of: prior to transmitting uplink data in the trading initiation, inputting the user's identity identification code, the personal identification number, a trading host code and a trading type code to the wireless two-way communication device; using the personal identification number as a key for being encrypted by an encryption method such as DES (data encryption standard), so as to acquire an encrypted personal identification number key to be stored in a memory unit of the wireless two-way communication device; encrypting the device identification code of the wireless two-way communication device by the personal identification number key so as to generate an encrypted device identification code; incorporating the personal identification number key and the encrypted device identification code, for being digitally signed by a one-way hash function so as to acquire a digital signature; incorporating the personal identification number key, the encrypted device identification code and the digital signature, for being symmetrically encrypted by the encrypted personal identification number key so as to acquire re-encrypted data; incorporating the trading host code, the trading type code, the identity identification code and the re-encrypted data, for being transmitted by the wireless two-way communication device to the trading host; prior to transmitting downlink data in the trading initiation, acquiring via the trading host a set of keys, i.e. a trading host key and a trading data key, relating to the identity identification code from the memory unit of the trading host according to the identity identification code; using the device identification code of the wireless two-way communication device and the personal identification number key as keys, for symmetrically encrypting the trading host key and the trading data key sequentially; incorporating the encrypted trading host and trading data keys to form a trading result, for being digitally signed by the one-way hash function so as to generate digitally signed data; and incorporating the identity identification code, the trading result and the digitally signed data, for being transmitted by the trading host to the wireless two-way communication device.

In addition, prior to performing the trading and after completing the trading initiation, the method of the invention further comprises the steps of: inputting the identity identification code, the personal identification number, a trading host code, a trading type code and related trading data to the wireless two-way communication device; using the personal identification number as a key, for being encrypted by a symmetric encryption method such as DES (data encryption standard), so as to acquire an encrypted personal identification number key; incorporating the encrypted personal identification number key and the trading data input to the wireless two-way communication device to form incorporated trading data for being digitally signed by a one-way hash function so as to acquire a digital signature, and incorporating the incorporated trading data and the digital signature to generate new incorporated trading data; symmetrically encrypting the new trading data by a trading data key of the set of keys in the trading initiation so as to acquire encrypted second incorporated trading data; incorporating the identity identification code and the encrypted second incorporated trading data to form third incorporated trading data, for being symmetrically encrypted by a trading host key of the set of keys in the trading initiation so as to generate re-encrypted third incorporated trading data; incorporating the trading host code, the device identification code of the wireless two-way communication device, the trading type code and the re-encrypted third incorporated trading data, for being transmitted by the wireless two-way communication device to the trading host; prior to transmitting downlink data in the trading performance, outputting via the trading host a trading result for being digitally signed by the one-way hash function so as to generate a digitally signed trading result, and incorporating the trading result and the digitally signed trading result to form trading data; obtaining via the trading host a trading data key in a set of keys relating to the identity identification code according to the identity identification code, and symmetrically encrypting the trading data by the trading data key so as to generate encrypted trading data; encrypting the encrypted trading data by the trading data key so as to form re-encrypted trading data; and incorporating the identity identification code and the re-encrypted trading data, for being transmitted by the trading host to the wireless two-way communication device.

BRIEF DESCRIPTION OF THE DRAWINGS

The invention can be more fully understood by reading the following detailed description of the preferred embodiment, with reference made to the accompanying drawings, wherein.

DETAILED DESCRIPTION OF THE PREFERRED EMBODIMENTS

Figure 1:
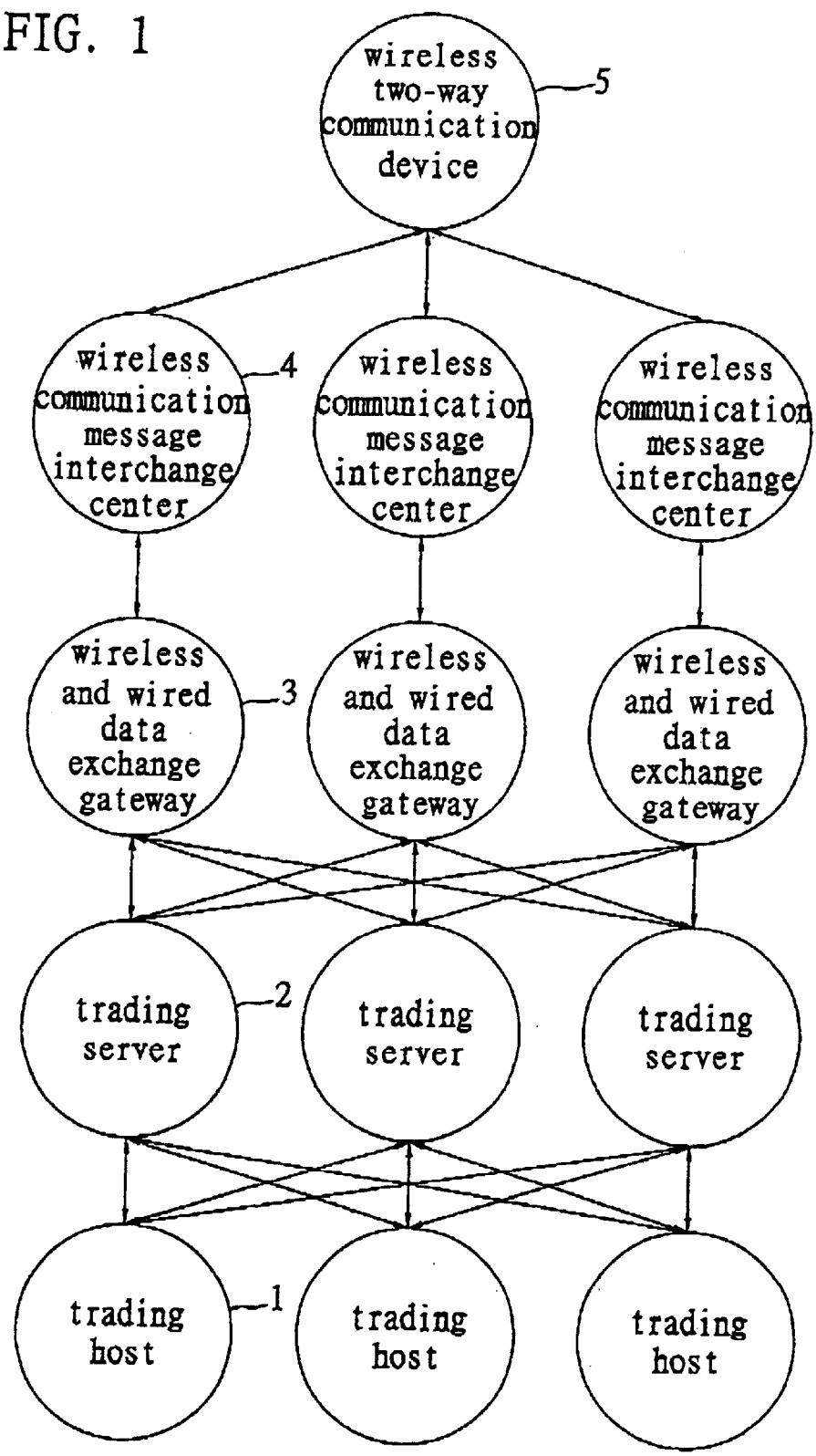
FIG. 1 is a schematic diagram showing a basic hardware structure of the system for a secure trading mechanism combining wireless communication and wired communication of the invention.

Illustrated in FIG. 1 is a basic hardware structure of the system for a secure trading mechanism combining wireless communication and wired communication of the invention. As shown in the drawing, the system of the present invention includes a plurality of trading hosts 1, a plurality of trading servers 2, a plurality of wireless and wired data exchange gateways 3, a plurality of wireless communication message interchange centers 4, and a wireless two-way communication device 5. The trading hosts 1, the trading servers 2, and the wireless and wired data exchange gateways 3 are of a wired communication configuration, while the wired communication message interchange centers 4 and the wireless two-way communication device 5 are in wireless communication construction.

The trading hosts 1 each has a memory unit, a secure communication protocol, and encryption and decryption software. The memory unit is used to store an identity identification code, a personal identification number (PIN), a device identification code dedicated for a wireless two-way communication device of a user, and a plurality of keys, which are input by the user. The secure communication protocol allows data transmission and communication with the trading server 2. The encryption and decryption software functions in encrypting and decrypting data received and transmitted by the trading host 1. Moreover, the trading host 1 further provides a method for determining the correctness of the PIN for each transaction, a method for modifying the PIN, and a function of being a router. The trading host 1 therefore serves as a device for registration prior to performing e-commerce.

The trading servers 2 each has a memory unit for recording a look-up table of correlation between the trading server 2 and the trading host 1, a secure communication protocol for data transmission and communication with the trading host 1 and with the wireless and wired data exchange gateway 3 respectively, and a function of being a router. Moreover, the trading server 2 serves as a communication interface between the trading host 1 and the wireless and wired data exchange gateway 3, in a manner that the trading server 2 receives data from the trading host 1 and then transmits the data to the wireless and wired data exchange gateway 3, or receives the data from the wireless and wired data exchange gateway 3 and then transmits the data to the trading host 1. In this case, the trading server 2 is connected to the wireless and wired data exchange gateway 3 through Ethernet or a dedicated modem.

The wireless and wired data exchange gateways 3 each has a memory unit for recording a look-up table of correlation between a trading type and the trading server 2, a secure communication protocol for data transmission and communication with the trading server 2 and with the wireless communication message interchange center 4 respectively, and a function of being a router. Moreover, the wireless and wired data exchange gateway 3 receives data from the trading server 2 and then transmits the data to the wireless communication message interchange center 4, or receives the data from the wireless communication message interchange center 4 and then transmits the data to the trading server 2. As such, the wireless and wired data exchange gateway 3 serves as a communication interface between the trading server 2 and the wireless communication message interchange center 4.

The wireless communication message interchange centers 4 each has a communication device for receiving and transmitting wireless messages, a secure communication protocol for data transmission and communication with the wireless and wired data exchange gateway 3 and with the wireless two-way communication device 5 respectively, and a function of being a router. Further, the wireless communication message interchange center 4 receives data from the wireless and wired data exchange gateway 3 and then transmits to the wireless two-way communication device 5, or receives the data from the wireless two-way communication device 5 and then transmits the data to the wireless and wired data exchange gateway 3. Accordingly, the wireless communication message interchange center 4 serves as a communication interface between the wireless and wired data exchange gateway 3 and the wireless two-way communication device 5.

The wireless two-way communication device 5 has a communication device for receiving and transmitting wireless messages; a memory unit for storing trading data and a device identification code dedicated for the device 5; a smart card for storing a plurality of keys; a secure communication protocol for data transmission and communication with the wireless communication message interchange centers 4; encryption and decryption software for encrypting and decrypting data received and transmitted by the device 5; a method for inputting the PIN; and software for managing each trade. In this case, the wireless two-way communication device 5 can be a mobile phone or a personal digital assistant (PDA), etc. Moreover, the wireless two-way communication device 5 serves as a controlling center for trading management of the present system, and has a wireless communication number for identifying an address of a transmitting network. Furthermore, the smart card is a so-called IC card or chip card for enhancing a mechanism for identity identification; whereas, besides strong operation and encryption and decryption, the smart card is originally provided with a security function, that is, if the identification code is failed to be correctly read over three times, the smart card is automatically locked and no data can be read out. Therefore, the smart card is essentially part of the Public-Key Infrastructure (PKI); while the sets of keys stored in the smart card of the wireless two-way communication device, containing a key Kd for trading data, a key Km for encrypting the trading hosts 1 and a secure length of each of the keys, are used for trading in a number determined according to the trading security.

The encrypt and decryption method used in the present system includes a data encryption standard (DES) for encrypting and decrypting the trading data symmetrically, and a digital signature using a one-way hash function of MD5 (message digest 5) or SHA (secure hash algorithm) for digitally signing the trading data. Since the DES encryption and encryption method is known in the prior art, thus it will not be further described herein.

Figure 2:
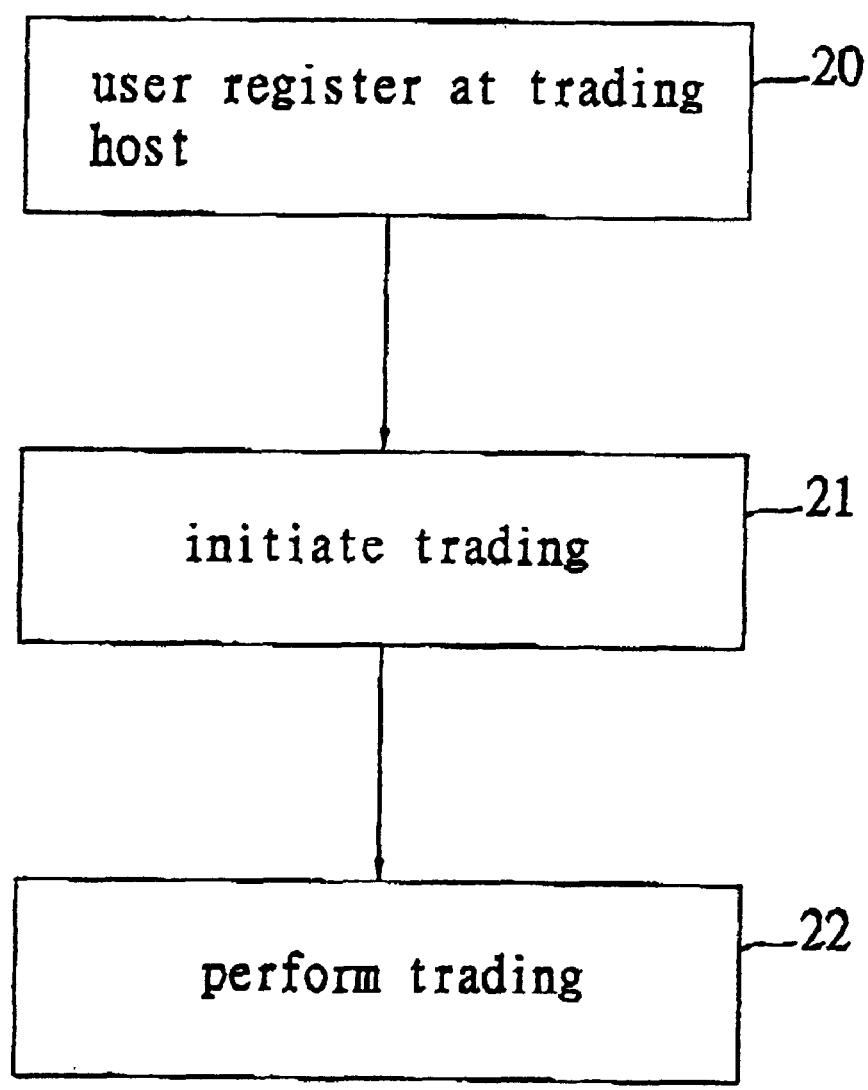
FIG. 2 is a schematic diagram showing the steps involved in executing e-commerce in operation of the system for a secure trading mechanism combining wireless communication and wired communication of the invention in FIG. 1.

FIG. 2 illustrates the steps involved in executing e-commerce in operation of the system for a secure trading mechanism combining wireless communication and wired communication of the invention in FIG. 1. As shown in the drawing, first, in step 20, the user registers at the trading host 1 for inputting the unique identity identification code, the personal identification number, and the device identification code dedicated for the user's wireless two-way communication device to be stored in the memory unit of the trading host 1. Then, step 21 is performed.

In step 21, trading is initiated between the trading host 1 and the wireless two-way communication device 5, that is, as the wireless two-way communication device 5 is notified that the user at the trading host 1 desires to perform e-commerce, and the user is correctly identified in identity, then the set of keys in the trading host 1 are stored in a smart card of the wireless two-way communication device 5. Then, step 22 is performed.

In step 22, the trading between the wireless two-way communication device 5 and the trading host 1 is performed, that is, after the user inputs related trading data, and perform an encryption process for the set of keys, the encrypted trading data can then be transmitted to the trading host 1 for assuring the security of the trading data during transmission.

Figure 3:
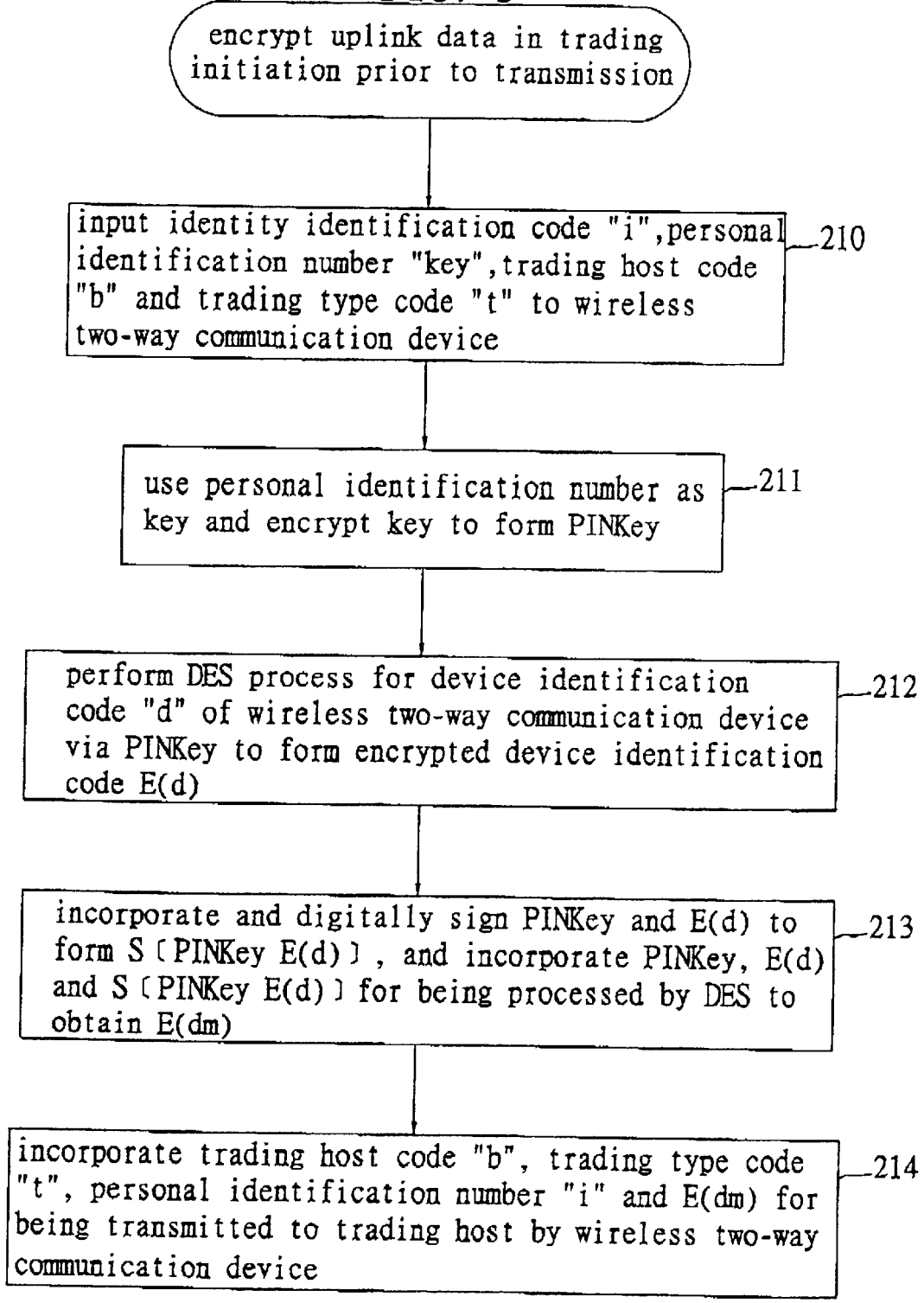
FIG. 3 is a schematic diagram showing the steps involved in encrypting uplink data prior to be transmitted in a step of initiating trading in FIG. 2.

FIG. 3 shows the steps involved in encrypting uplink data prior to be transmitted in a step of initiating trading in FIG. 2. First, in step 210, the user inputs the identity identification code "i", the personal identification number "key", the trading host code "b", and the trading type code "t" to the wireless two-way communication device 5. Then, step 211 is performed.

In step 211, the PIN "key" is used as a key, while it is encrypted by a symmetric encryption method e.g. DES, and therefore an encrypted personal identification number key "PINKey" is obtained for being stored in the memory unit of the wireless two-way communication device 5. Then, step 212 is performed.

In step 212, the unique device identification code "d" of the wireless two-way communication device 5 is obtained and encrypted by the PINKey to be an encrypted device identification code E(d). Then, step 213 is performed.

In step 213, the PINKey is incorporated wit the E(d), and the incorporated data are digitally signed to generate digital signed data S [PINKEY E(d)]; while the S [PINKEY E(d)] and the incorporated data of the PINKey and the E(d) are incorporated and symmetrically encrypted by the PINKey to generate an re-encrypted data E(dm). Then, step 214 is performed.

In step 214, the trading host code "b", the trading type code "t", the user's identity identification code "i" and the re-encrypted data E(dm) are incorporated to be transmitted to the wireless two-way communication device 5.

Figure 4:
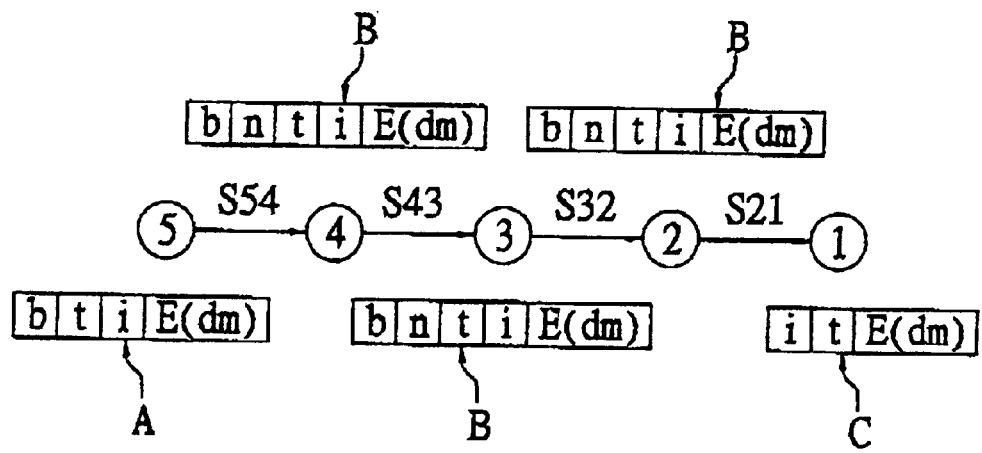
FIG. 4 is a schematic diagram showing the steps involved in encrypting and decrypting trading data and assuring the correctness of the trading data in operation of a wireless two-way communication device during transmitting uplink data in a step of initiating trading in FIG. 2.

FIG. 4 illustrates the steps involved in encrypting and decrypting trading data and assuring the correctness of the trading data in operation of a wireless two-way communication device during transmitting uplink data in a step of initiating trading in FIG. 2. As shown in the drawing, after incorporating the trading host code "b", the trading type code "t", the identity identification code "i", and the re-encrypted data E(dm) into a trading data list A, the wireless two-way communication device 5 transmits the trading data list A to the trading host 1. First, the trading data list A is transmitted to the wireless communication message interchange center 4 by a secure communication protocol S54 between the wireless two-way communication device 5 and the wireless communication message interchange center 4. Next, the trading data list A is examined and incorporated with a wireless communication number "n" of the wireless two-way communication device 5 to form a trading data list B, which is then transmitted to the wireless and wired data exchange gateway 3 by a secure communication protocol S43 between the wireless communication message interchange center 4 and the wireless and wired data exchanging gateway 3. Next, the wireless and wired data exchanging gateway 3 transfers the trading data list B to the trading server 2 via a secure communication protocol S32 of the trading server 2 relating to the trading host code "b" in the trading data list B. Next, the trading server 2 transfers the trading data list B and the identity identification code "i" to the trading host 1 according to the trading type code "t" in the trading data list B via a security communication protocol S21 between the trading server 2 and the trading host 1. Next, the trading host 1 receives a trading data list C and then acquires the PINKey in the memory unit of the trading host 1 according to the trading type "t" and the identity identification code "i" in the trading data list C. Next, the PINKey is used for decrypting the encrypted trading data transmitted from the wireless two-way communication device 5. The digital signature associated with the trading data is then verified for examining if the trading data is illegally changed. After the digital signature is verified to be correct, the device identification code of the wireless two-way communication device 5 is compared with the device identification code registered by the user. If the two codes are identical, the trading host 1 performs a transmission operation for downlink data to the wireless two-way communication device 5 during initiating the trading. That is, the trading host 1 transfers multiple sets of keys to the wireless two-way communication device 5 for assuring the security of subsequent data transmission during performing the trading.

Figure 5:
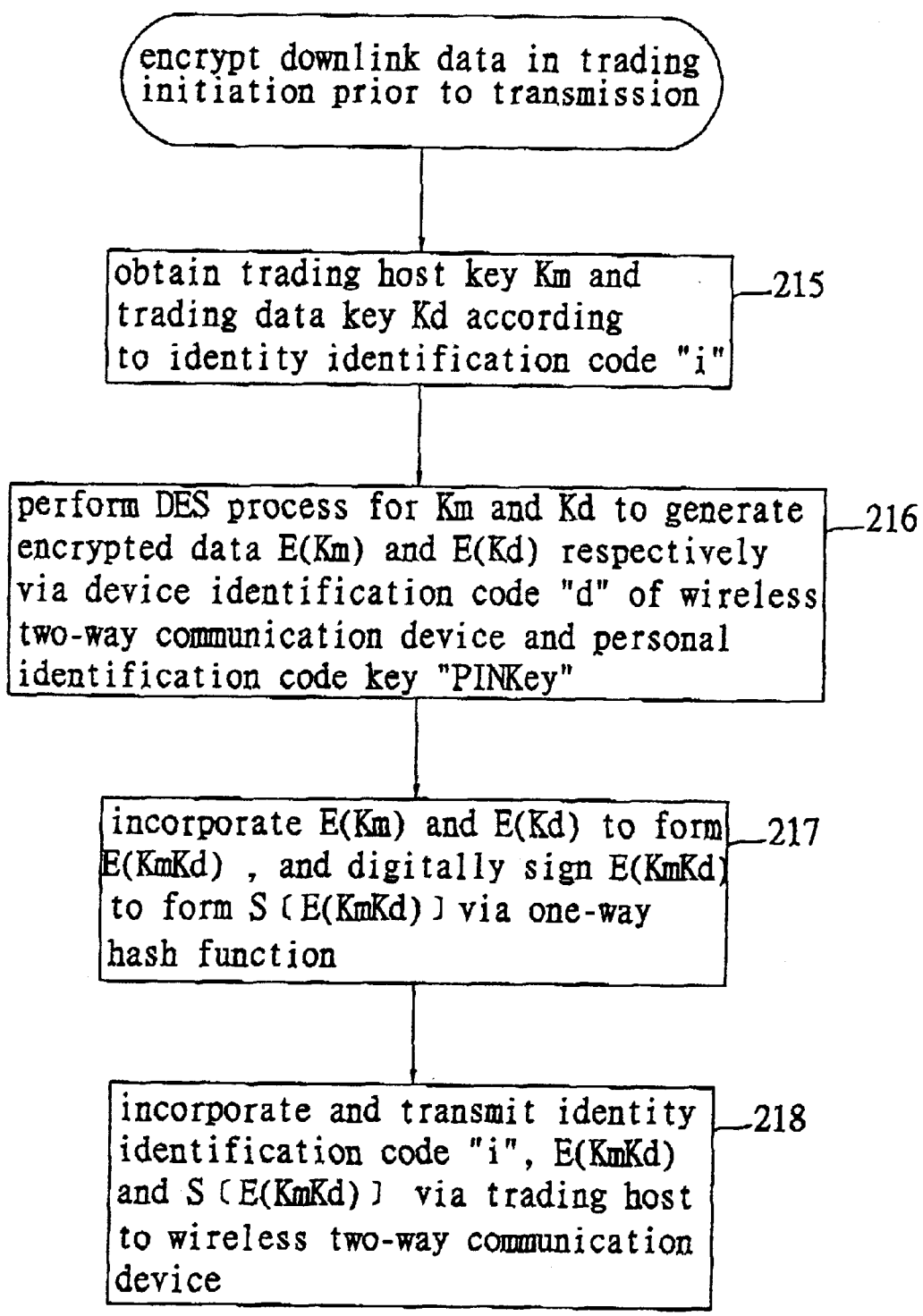
FIG. 5 is a schematic diagram showing the steps involved in encrypting downlink data prior to be transmitted in a step of initiating trading in FIG. 2.

FIG. 5 shows the steps involved in encrypting downlink data prior to be transmitted in a step of initiating trading in FIG. 2. First, in step 215, the trading host 1 takes account of the identity identification code "i" for acquiring the related set of keys from the memory unit, i.e. the trading host key Km and trading data key Kd. Then, step 216 is performed.

In step 216, the device identification code "d" of the wireless two-way communication device 5 and the PINKey are used as keys, and the trading host key Km and trading data key Kd are encrypted symmetrically to form encrypted data E(Km) and E(Kd), respectively. Then, step 217 is performed.

In step 217, the encrypted data E(Km) and E(Kd) are incorporated to form a trading result E(KmKd), which is then digitally signed by the one-way hash function, so as to generate digitally signed data S [E(KmKd)]. Then, step 218 is performed.

In step 218, the identity identification "i", the trading result E(KmKd) and the digitally signed data S [E(KmKd)] are incorporated and then transmitted to the wireless two-way communication device 5 by the trading host 1.

Figure 6:
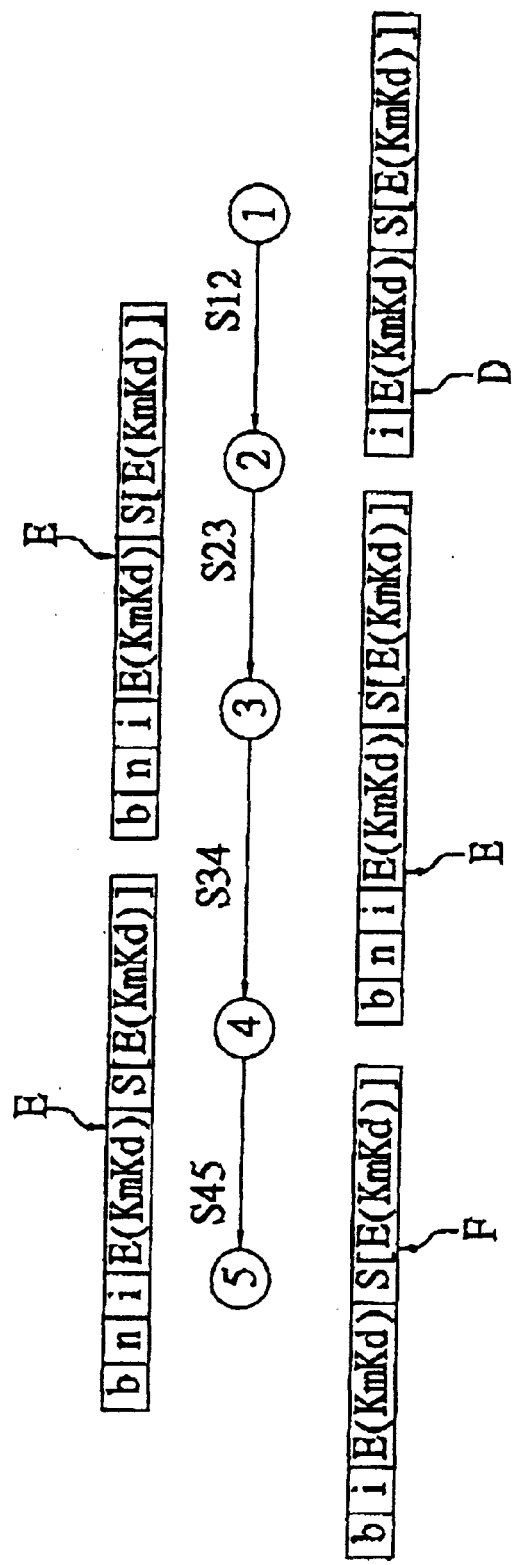
FIG. 6 is a schematic diagram showing the steps involved in encrypting and decrypting trading data and assuring the correctness of the trading data in operation of a wireless two-way communication device during transmitting downlink data in a step of initiating trading in FIG. 2.

FIG. 6 shows the steps involved in encrypting and decrypting trading data and assuring the correctness of the trading data in operation of a wireless two-way communication device during transmitting downlink data in a step of initiating trading in FIG. 2. First, the identity identification "i", the trading result E(KmKd) and the digitally signed data S [E(KmKd)] are incorporated to form an encrypted trading data list D, which is then transmitted to the wireless two-way communication device 5 by the trading host 1. The trading mainframe 1 transfers the trading data list D to the trading server 2 according to the secure communication protocol S12 between the trading host 1 and the trading server 2.

Next, the trading host code "b" and the wireless communication number "n" temporarily stored in the memory unit of the trading sewer 2 and the trading data list D from the trading host 1 are incorporated to form a new trading data list E, which is then transferred to the wireless and wired data exchanging gateway 3 by the secure communication protocol S23 between the trading server 2 and the wireless and wired data exchanging gateway 3. Next, the trading data list E is further transferred to the wireless communication message interchange center 4 by the secure communication protocol S34 between the wireless and wired data exchange gateway 3 and the wireless communication message interchange center 4. Next, the wireless communication message interchange center 4 transfers the trading data list E to the wireless two-way communication device 5 assigned by the wireless communication number "n" according to the wireless communication number "n" and the secure communication protocol S45 between the wireless communication message interchange center 4 and the wireless two-way communication device 5. Next, After the wireless two-way communication device 5 receives the trading data list E, the digital signature for the trading data from the trading host 1 is verified by using the one-way hash function. If it is verified to be correct, the personal identification number "key" associated with the identity identification code "i" is requested to be input by the user to the wireless two-way communication device 5, and the "key" is used as the personal identification number key "PINKey". Then, the encrypted trading result E(KmKd) in the trading data list E is decrypted by the PINKey and the device identification code of the wireless two-way communication device 5 so as to obtain the trading host key Km and the trading data key Kd. Finally, the wireless two-way communication device 5 receives a trading data list F, and decrypts the encrypted trading result E(KmKd) and the digitally signed data S [E(KmKd)] in the trading data list F with reference to the identity identification code "i" in the trading data list F. Then, the dedicated multiple key sets are stored in the smart card of the wireless two-way communication device 5. Therefore, the process of initiating wading is completed for allowing the trading to be performed subsequently.

Figure 7:
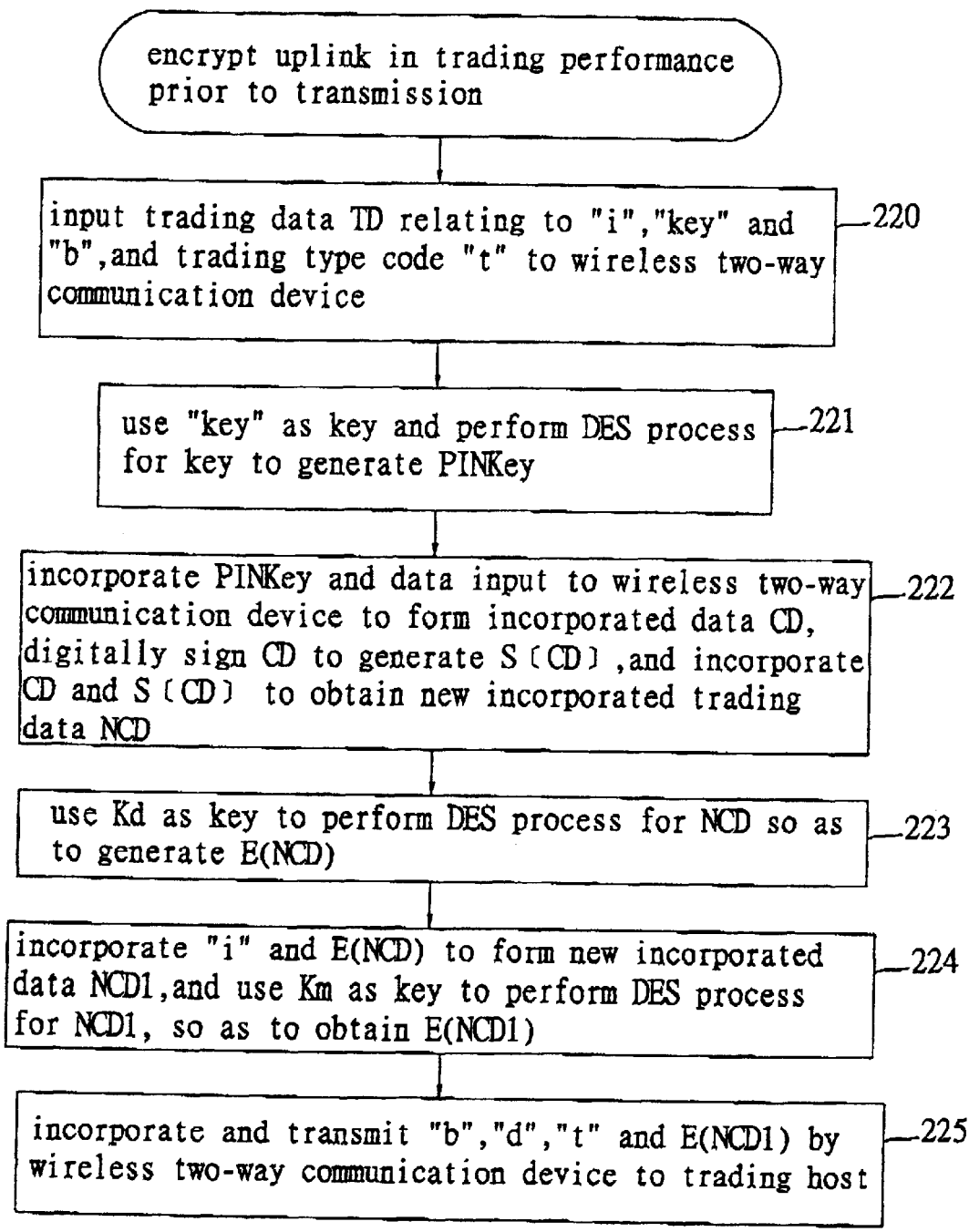
FIG. 7 is a schematic diagram showing the steps involved in encrypting uplink data prior to be transmitted in a step of performing trading in FIG. 2.

FIG. 7 shows the steps involved in encrypting uplink data prior to be transmitted in a step of performing trading in FIG. 2. First, in step 220, the wireless two-way communication device 5 is input with the identity identification code "i", the personal identification number "key", the trading host code "b", the trading type code "t", related trading data TD, etc. Then, step 221 is performed.

In step 221, the encrypted PINKey is incorporated with all the trading data input to the wireless two-way communication device 5 so as to acquire incorporated trading data CD, which are digitally signed by the one-way hash function so as to acquire a digital signature S [CD]. Then, the incorporated trading data CD and the digital signature S [CD] are incorporated to form new incorporated trading data NCD. Then, step 223 is performed.

In step 223, the new trading data NCD are symmetrically encrypted by the trading data key Kd obtained from the trading initiation so as to acquire encrypted incorporated trading data E(NCD). Then, step 224 is performed.

In step 224, the identity identification code "i" and the encrypted incorporated trading data E(NCD) are incorporated for generating new incorporated trading data NCD1, which are symmetrically encrypted by the trading host key Km acquired from the trading initiation so as to form further encrypted incorporated trading data E(NCD1). Then, step 225 is performed.

In step 225, the trading host code "b", the device identification code "d" of the wireless two-way communication device 5, the trading type code "t" and the further encrypted incorporated trading data E(NCD1) are incorporated and then transmitted by the wireless two-way communication device 5 to the trading host 1.

Figure 8:
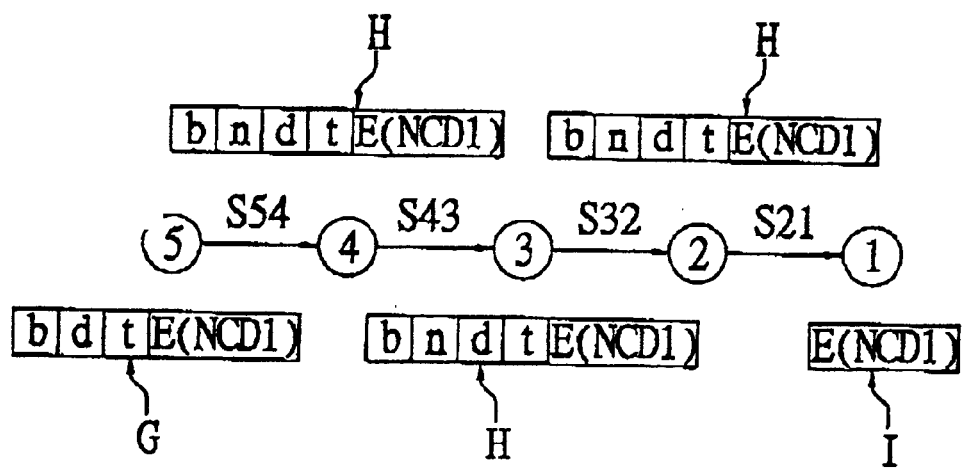
FIG. 8 is a schematic diagram showing the steps involved in encrypting and decrypting trading data and assuring the correctness of the trading data in operation of a wireless two-way communication device during transmitting uplink data in a step of performing trading in FIG. 2.

FIG. 8 shows the steps involved in encrypting and decrypting trading data and assuring the correctness of the trading data in operation of a wireless two-way communication device during transmitting uplink data in a step of performing trading in FIG. 2. The transmission process for the uplink data during performing the trading is identical that during initiating the trading as shown in FIG. 4, with differences in the contents of transmitted trading data lists, and the decryption process performed by the trading host 1 for a trading data list G transmitted from the wireless two-way communication device 5. After the trading host 1 acquires the trading host key Km according to the device identification code of the wireless two-way communication device 5, it receives and then decrypts a trading data list I. Next, after the trading data key Kd is acquired from the firstly decrypted data according to the identity identification code "i", the firstly decrypted data are further decrypted. Then, the personal identification number key "PINKey" in the trading host 1 and related trading data are incorporated and then digitally signed by the one-way hash function. Then, the digitally signed trading data are examined for being illegally changed in the transmission process or not. Then, the trading host 1 acquires the personal identification number "key" according to the identity identification code "i", while the "key" is encrypted so as to obtain the personal identification number key "PINKey", which is then determined to be identical to the PINKey from the wireless two-way communication device 5 or not. When all the related trading data are determined to be identical by the trading host 1, the trading host 1 performs the transmission operation of downlink data in the trading performance for the wireless two-way communication device 5. That is, the trading host 1 transfers an acknowledged message of the determined result and outputs a trading result to the wireless two-way communication device 5. In addition, the decryption process is prevented from being performed by a device other than the trading host 1.

Figure 9:
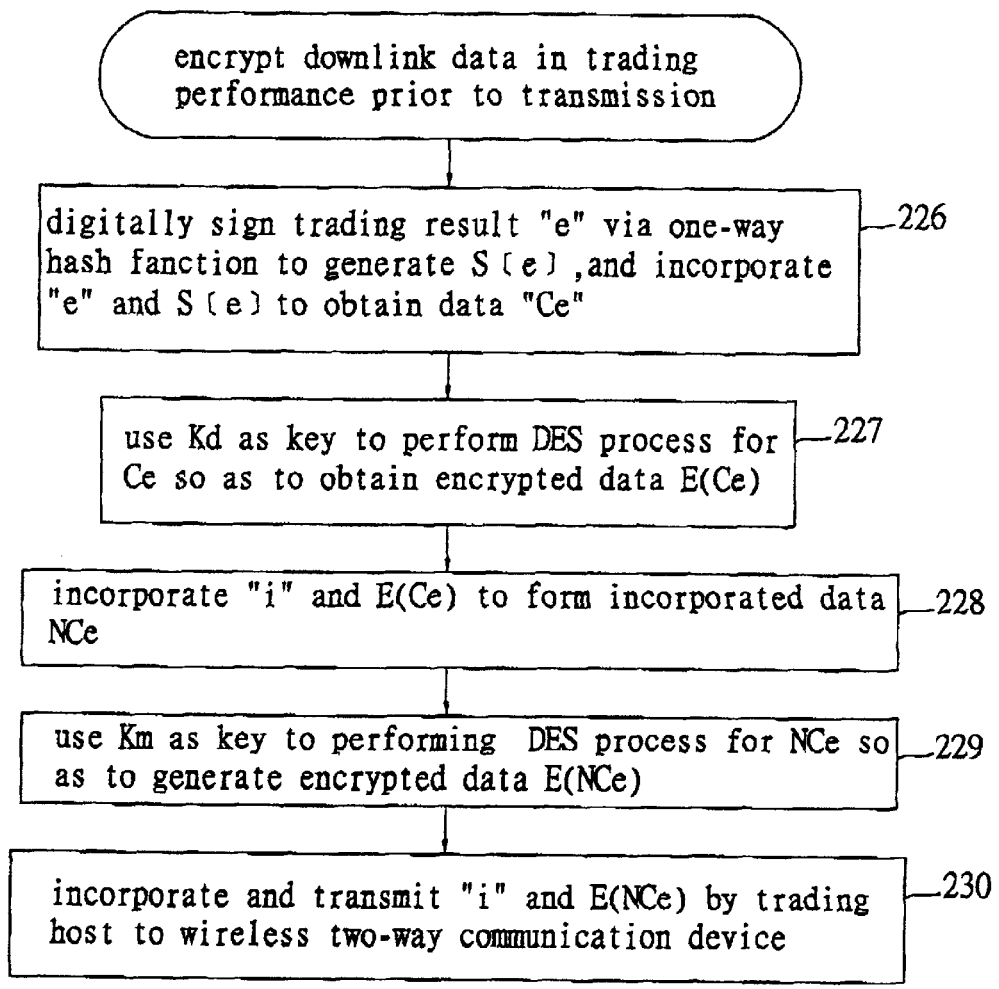
FIG. 9 is a schematic diagram showing the steps involved in encrypting downlink data prior to be transmitted in a step of performing trading in FIG. 2.

FIG. 9 illustrates the steps involved in encrypting downlink data prior to be transmitted in a step of performing trading in FIG. 2. First, in step 226, the trading host 1 outputs the trading result "e", which is digitally signed by the one-way hash function so as to acquire a digitally signed trading result S [e]. Then, the trading result "e" and the digitally signed result S [e] are incorporated to form trading data Ce. Then, step 227 is performed.

In step 227, the trading host 1 obtains the trading data key Kd from the set of keys related to the identity identification code "i" according to the identity identification code "i", and symmetrically encrypts the trading data Ce via the trading data key Kd so as to generate encrypted data E(Ce). Then, step 228 is performed.

In step 228, the identity identification code "i" and the encrypted data E(Ce) are incorporated to form new incorporated trading data NCe. Then, step 229 is performed.

In step 229, the new incorporated data NCe are encrypted by the trading host key Km so as to acquire secondly encrypted trading data E(NCe). Then, step 230 is performed.

In step 230, the identity identification code "i" and the secondly encrypted trading data E(NCe) are incorporated, and then transmitted to the wireless two-way communication device 5 by the trading host 1.

Figure 10:
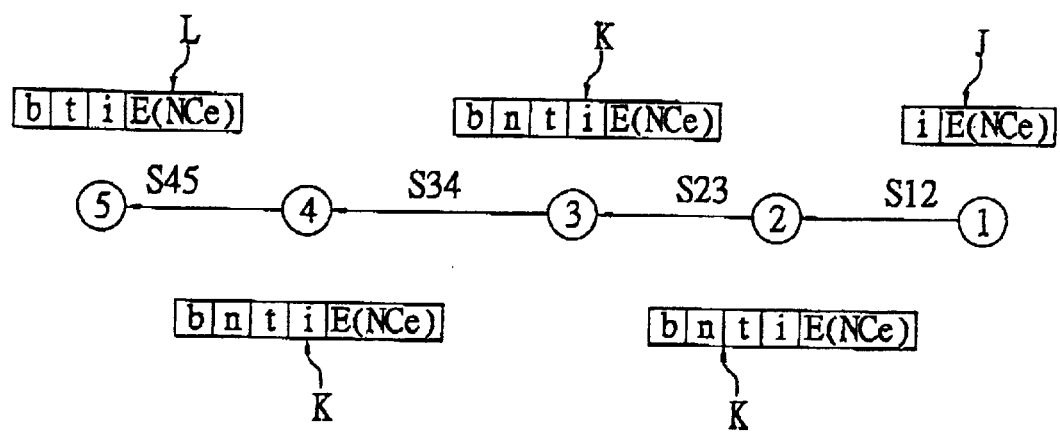
FIG. 10 is a schematic diagram showing the steps involved in encrypting and decrypting trading data and assuring the correctness of the trading data in operation of a wireless two-way communication device during transmitting downlink data in a step of performing trading in FIG. 2.

FIG. 10 illustrates the steps involved in encrypting and decrypting trading data and assuring the correctness of the trading data in operation of a wireless two-way communication device during transmitting downlink data in a step of performing trading in FIG. 2. After the identity identification code "i" and the encrypted data E(NCe) are incorporated to form a trading data list J, the trading host 1 transmits the trading data list J to the wireless two-way communication device 5. The transmission process for the trading data list J from the trading host 1 to the wireless two-way communication device 5 is identical to the transmission process for the downlink data in the trading initiation with the only difference in the contents of the transmitted data, and thus it will not be further described herein.

The invention has been described using exemplary preferred embodiments. However, it is to be understood that the scope of the invention is not limited to the disclosed embodiments. On the contrary, it is intended to cover various modifications and similar arrangements. The scope of the claims, therefore, should be accorded the broadest interpretation so as to encompass all such modifications and similar arrangements.

What is claimed is:

1. A method for a secure trading mechanism combining wireless communication and wired communication, comprising the steps of:

(1) registering at a trading host, wherein a user inputs data including a unique identity identification code, a personal identification number and a device identification code dedicated for a wireless two-way communication device of the user, and stores the data in a memory unit of the trading host;

(2) inputting the user's identity identification code, the personal identification number, a trading host code and a trading type code to the wireless two-way communication device;

(3) using the personal identification number as a key for being encrypted by an encryption method of DES (data encryption standard), so as to acquire an encrypted personal identification number key to be stored in a memory unit of the wireless two-way communication device;

(4) encrypting the device identification code of the wireless two-way communication device by the personal identification number key so as to generate an encrypted device identification code, and incorporating the personal identification number key and the encrypted device identification code, for being digitally signed by a one-way hash function so as to acquire a digital signature;

(5) incorporating the personal identification number key, the encrypted device identification code and the digital signature, for being symmetrically encrypted by the encrypted personal identification number key so as to acquire re-encrypted data;

(6) incorporating the trading host code, the trading type code, the identification code and the re-encrypted data obtained from step (5), for being transmitted, by the wireless two-way communication device to the trading host;

(7) acquiring via the trading host a set of keys, including a trading host key and a trading data key, relating to the identity identification code from the memory unit of the trading host according to the identity identification code;

(8) using the device identification code of the wireless two-way communication device and the personal identification number key as keys for symmetrically encrypting the trading host key and the trading data key sequentially;

(9) incorporating the encrypted trading host key and trading data key to form a trading result for being digitally signed by the one-way hash function so as to generate digitally signed data;

(10) incorporating the identity identification code, the trading result and the digitally signed data, for being transmitted by the trading host to the wireless two-way communication device;

(11) initiating trading between the trading host and the wireless two-way communication device, in a manner that the wireless two-way communication device acquires information of the user about to perform e-commerce, verifies the user in correct identity, and transmits the set of keys stored in the trading host to a smart card of the wireless two-way communication device for storage; and

(12) performing the trading between the wireless two-way communication device and the trading host, in a manner that after the user inputs related trading data to the wireless two-way communication device, the related trading data are encrypted by the set of keys and transmitted to the trading host, wherein the wading data is merely able to be decrypted by the trading host so as to assure security of the trading data in transmission.

2. The method of claim 1, wherein prior to executing the step (12) and after completing the step (11), further comprising the steps of:

(12-1) inputting the identity identification code, the personal identification number, a the trading host code, the wading type code and related trading data to the wireless two-way communication device;

(12-2) using the personal identification number as a key, for being encrypted by a symmetric encryption method of DES (data encryption standard), so as to acquire an encrypted personal identification number key;

(12-3) incorporating the encrypted personal identification number key and the trading data input to the wireless two-way communication device to form incorporated trading data for being digitally signed by the one-way hash function so as to acquire a digital signature, and incorporating the incorporated trading data and the digital signature to generate new incorporated trading data;

(12-4) symmetrically encrypting the new trading data by the trading data key of the set of keys in the trading initiation so as to acquire encrypted second incorporated trading data;

(12-5) incorporating the identity identification code and the encrypted second incorporated trading data to form third incorporated trading data, for being symmetrically encrypted by a trading host key of the set of keys in the trading initiation so as to generate re-encrypted third incorporated trading data;

(12-6) incorporating the trading host code, the device identification code of the wireless two-way communication device, the trading typo code and the re-encrypted third incorporated trading data, for being transmitted by the wireless two-way communication device to the trading host;

(12-7) prior to transmitting downlink data in the trading performance, outputting via the trading host a trading result for being digitally signed by the one-way hash function so as to generate a digitally signed trading result, and incorporating the trading result and the digitally signed trading result to form trading data;

(12-8) obtaining via the trading host a trading data key in a set of keys relating to the identity identification code according to the identity identification code, and symmetrically encrypting the trading data obtained in step (12-7) by the trading data key so as to generate encrypted trading data;

(12-9) encrypting the encrypted trading data by the trading data key so as to form re-encrypted trading data; and (12-10) incorporating the identity identification code and the re-encrypted trading data, for being transmitted by the trading host to the wireless two-way communication device.

3. The method of claim 1, wherein encryption and decryption methods used in the method include a data encryption standard (DES) for encrypting and decrypting trading data symmetrically, and a digital signature using a one-way hash function of MD5 (message digest 5) or SHA (secure hash algorithm) for digitally signing the trading data.

4. The method of claim 2, wherein encryption and decryption methods used in the method include the data encryption standard (DES) for encrypting and decrypting trading data symmetrically, and a digital signature using the one-way hash function of MD5 (message digest 5) or SHA (secure hash algorithm) for digitally signing the trading data.

5. A system for a secure trading mechanism combining wireless communication and wired communication, comprising;

wired communication devices including a plurality of trading hosts, a plurality of trading servers, and a plurality of wireless and wired data exchange gateways; and wireless communication devices including a plurality of wireless communication message interchange centers and a wireless two-way communication device; wherein the trading hosts each has a memory unit for storing an identity identification code, a personal identification number, a device identification code dedicated for a wireless two-way communication device of a user and a plurality of sets of keys, which are input by the user to the trading host; a secure communication protocol for allowing data transmission and communication with the trading servers; encryption and decryption software for encrypting and decrypting data received and transmitted by the trading host; a method for determining correctness of the personal identification number during trading; a method for modifying the personal identification number; and a function of being a router, so as to allow the trading hosts to serve as devices for registration prior to performing trading;

the trading servers each has a memory unit for recording a look-up table of correlation between the trading server and the trading hosts; a secure communication protocol for data transmission and communication with the trading hosts, and with the wireless and wired data exchange gateways; and a function of being a router; and the trading servers serve as communication interfaces between the trading hosts and the wireless and wired data exchange gateways, in a manner that the trading servers receive data from the trading hosts and transmit the data to the wireless and wired data exchange gateways, or receive data from the wireless and wired data exchange gateways and transmit the data to the trading hosts;

the wireless and wired data exchange gateways each has a memory unit for recording a look-up table of correlation between a trading type and the trading servers; a secure communication protocol for data transmission and communication with the trading servers, and with the wireless communication message interchange centers; and a function of being a router; and the wireless and wired data exchange gateways receive data from the trading servers and transmit the data to the wireless communication message interchange centers, or receive data from the wireless communication message interchange centers and transmit the data to the trading servers, so as to allow the wireless and wired data exchange gateways to serve as communication interfaces between the trading servers and the wireless communication message interchange centers;

the wireless communication message interchange centers each has a communication device for receiving and transmitting wireless messages; a secure communication protocol for data transmission and communication with the wireless and wired data exchange gateways, and with the wireless two-way communication device; and a function of being a router; and the wireless communication message interchange centers receive data from the wireless and wired data exchange gateways and transmit to the wireless two-way communication device, or receive data from the wireless two-way communication device and transmit the data to the wireless and wired data exchange gateways, so as to allow the wireless communication message interchange centers to serve as communication interfaces between the wireless and wired data exchange gateways and the wireless two-way communication device; and the wireless two-way communication device has a communication device for receiving and transmitting wireless messages; a memory unit for storing trading data and a device identification code dedicated for the wireless two-way communication device; a smart card for storing a plurality of sets of keys; a secure communication protocol for data transmission and communication with the wireless communication message interchange centers; encryption and decryption software for encrypting and decrypting data received and transmitted by the wireless two-way communication device; a method for inputting the personal identification number; and software for managing the trading; and the wireless two-way communication device serves as a controlling center for trading management of the present system, and has a wireless communication number for identifying an address of a transmitting network.

6. The system of claim 5, wherein the trading servers are connected to the wireless and wired data exchange gateways through Ethernet or a dedicated modem.

7. The system of claim 5, wherein the wireless two-way communication device is a mobile phone or a personal digital assistant.

8. The system of claim 5, wherein the smart card of the wireless two-way communication device is used for enhancing an identity identification mechanism, and has functions of strong operation, encryption and decryption, and a security mechanism, which allows the smart card to be automatically locked and no data to be read out if the personal identification number is failed to be correctly read over three times.

9. The system of claim 5, wherein the sets of keys stored in the smart card of the wireless two-way communication device, containing a key for trading data, a key for encrypting the trading hosts and a secure length of each of the keys, are used for trading in a number determined according to the trading security.

10. The system of claim 5, wherein encrypt and decryption methods used in the system include a data encryption standard (DES) for encrypting and decrypting trading data symmetrically, and a digital signature using a one-way hash function of MD5 (message digest 5) or SHA (secure bash algorithm) for digitally signing the trading data.

* * * * *